United States Patent [19]
Irie

[11] 3,936,746
[45] Feb. 3, 1976

[54] FM RECEIVER HAVING TRANSMITTING FUNCTION

[75] Inventor: Osamu Irie, Tokyo, Japan

[73] Assignee: Sony Corporation, Tokyo, Japan

[22] Filed: July 8, 1974

[21] Appl. No.: 486,314

[30] Foreign Application Priority Data
July 31, 1973   Japan............................ 48-90492[U]

[52] U.S. Cl. ...................... 325/20; 325/21; 325/346
[51] Int. Cl.² ............................................ H04B 1/44
[58] Field of Search .............................. 325/3, 6–8, 325/19–21, 311, 346, 17, 18

[56] References Cited
UNITED STATES PATENTS

| | | | |
|---|---|---|---|
| 2,379,395 | 6/1945 | Ziegler et al. ........................... | 325/18 |
| 2,846,572 | 8/1958 | Elliott .................................... | 325/20 |
| 2,972,047 | 2/1961 | Werner et al. ......................... | 325/20 |
| 2,991,353 | 7/1961 | Barnes .................................... | 325/17 |
| 3,219,931 | 11/1965 | Lennon et al. ......................... | 325/18 |
| 3,509,462 | 4/1970 | Ertman ................................... | 325/17 |

Primary Examiner—Benedict V. Safourek
Assistant Examiner—Marc E. Bookbinder
Attorney, Agent, or Firm—Lewis H. Eslinger; Alvin Sinderbrand

[57] ABSTRACT

An FM receiver having a signal transmission capability includes an FM signal receiving circuit including a local oscillator and an FM detector for receiving an FM signal and for demodulating the received signal to derive an audio signal therefrom. A frequency controller is responsive to a control signal for controlling the oscillating frequency of the local oscillator of the FM signal receiving circuit. A portion of the signal produced by the FM detector as well as a signal to be transmitted by the FM receiver are supplied to a first switch, the first switch being adapted to apply either of the signals supplied thereto to the frequency controller as a control signal therefor. A second switch is selectively operable to turn the control signal on or off.

4 Claims, 1 Drawing Figure

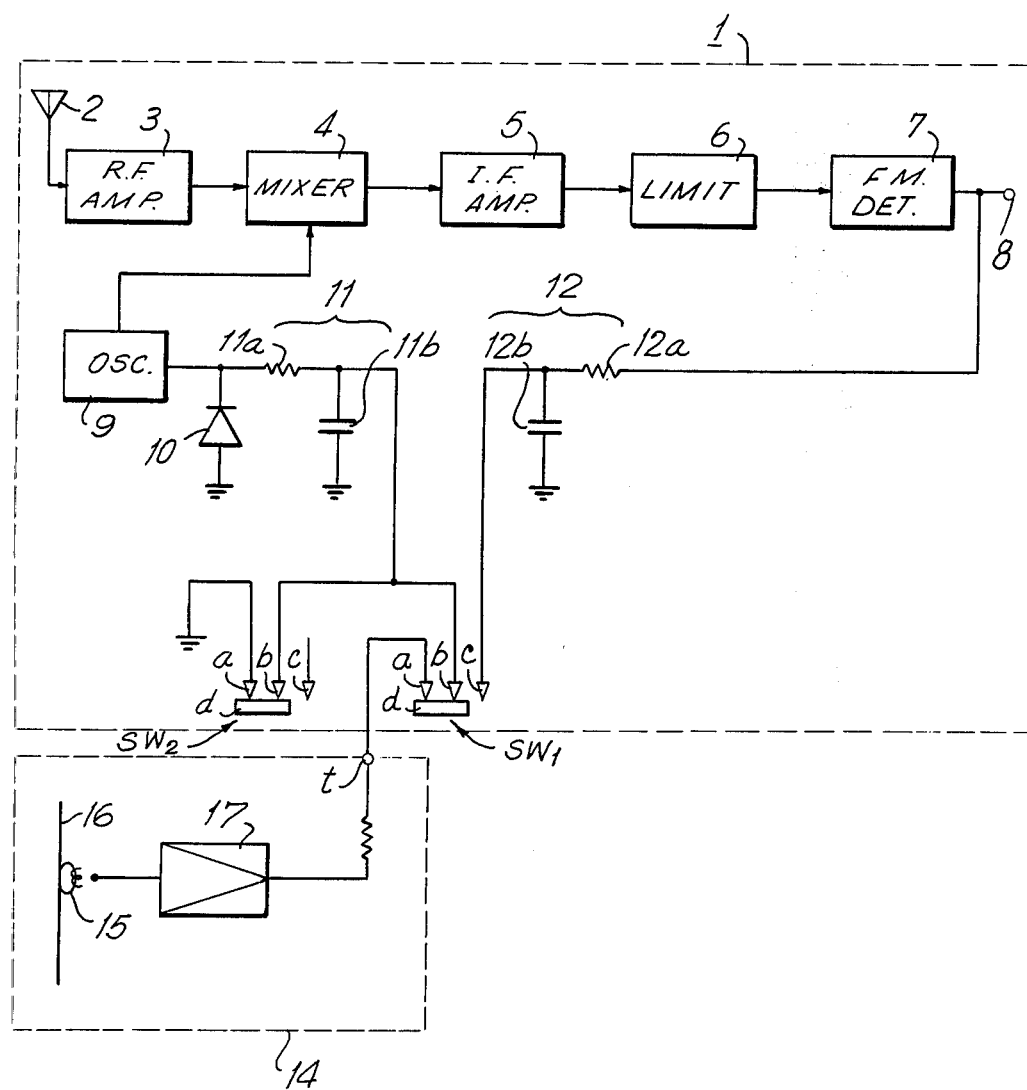

3,936,746

FM RECEIVER HAVING TRANSMITTING FUNCTION

BACKGROUND OF THE INVENTION

This invention relates to an FM receiver and, in particular, to an FM receiver that has a signal transmission capability.

In an FM receiver, a leakage portion of the local oscillating signal generated by the receiver local oscillator may be radiated from the receiver antenna as a spurious wave. Generally, this spurious wave radiation can be exploited for signal transmission by modulating the frequency of the local oscillator with an external signal. For example, the FM receiver can be used as an FM transmitter by modulating the local oscillator signal with an audio information signal.

FM receivers having automatic frequency control circuits (AFC) are known. Such AFC circuits control the frequency of the local oscillator and the FM receiver incorporating such circuits usually includes an AFC switch for the selective utilization of this feature. If it is desired to provide such an FM receiver with a signal transmission capability, it is necessary generally to include two more manually operable switches. One of these additional switches is used to change the FM receiver from a signal receiving mode to a signal transmitting mode and, of course, to the signal receiving mode. The other additional switch is used to turn off the transmitted signal, as by preventing the local oscillator from being modulated by the audio signal to be transmitted. However, where the limitation of space is a primary factor in the construction of such FM receivers, and in particular where the FM receiver is combined with a magnetic tape cassette recording/playback device, the use of three manually operable switches requires a significant portion of available space. In addition, the use of such three switches tends to increase the cost of production of the FM receiver.

OBJECTS OF THE INVENTION

Therefore, it is an object of the present invention to provide an improved FM receiver having a signal transmission capability.

It is another object of this invention to provide an FM receiver having a signal transmission capability which overcomes the problems heretofore found in the prior art devices.

It is yet another object of this invention to provide an FM receiver having a signal transmission capability that readily admits of compact construction and that is relatively inexpensive to manufacture.

A still further object of the present invention is to provide an FM receiver having a signal transmission capability wherein the number of manually operable selecting switches is significantly reduced in comparison with the number of switches heretofore used by the prior art devices.

Another object of this invention is to provide an FM receiver having a signal transmission capability that is of relatively simple circuit construction.

Various other objects and advantages of the invention will become apparent from the ensuing description and the novel features will be particularly pointed out in the appended claims.

SUMMARY OF THE INVENTION

In accordance with the present invention, an FM receiver having a signal transmission capability is provided including an FM signal receiving circuit including a local oscillator and an FM detector for receiving and demodulating an FM signal to derive an audio signal therefrom; a frequency controlling circuit coupled to the local oscillator and responsive to a control signal applied thereto for controlling the oscillating frequency of the local oscillator; a first switch for selectively supplying a portion of the signal produced by the FM detector or a signal to be transmitted by the FM receiver to the frequency controlling means as a control signal therefor; and a second switch for selectively turning the control signal on or off.

BRIEF DESCRIPTION OF THE DRAWING

The following detailed description of the present invention will be particularly understood when read in conjunction with the accompanying drawing in which the FIGURE illustrates a circuit diagram in partial block form and partial schematic form of an FM receiver in accordance with the present invention.

DETAILED DESCRIPTION OF A CERTAIN PREFERRED EMBODIMENT

Referring now to the drawing, the FM receiver 1 of the present invention is seen to comprise an antenna 2, a conventional FM signal processing circuit including a radio frequency amplifier 3, a mixer 4, an intermediate frequency amplifier 5, a limiter 6 and an FM detector 7. Also shown is a frequency controlling circuit including a variable capacitance diode 10, a first manually operable selecting switch SW1, and a second manually operable selecting switch SW2. Still further, a source of audio signals 14 is depicted. The conventional FM signal processing circuit is comprised of a series circuit adapted to demodulate the FM signals received at the antenna 2 to thereby derive an audio frequency information signal at an output terminal 8. Accordingly, as is well known, the radio frequency amplifier 3 is connected to the antenna 2 and includes an output terminal connected to the mixer 4. The mixer is adapted to generate an intermediate frequency signal that is related to the received FM signal in accordance with a local oscillator signal that is supplied thereto by the local oscillator 9. The output of the mixer 4 is coupled to the intermediate frequency amplifier 5 which, in turn, is connected by the limiter 6 to the FM detector 7. The FM detector is conventional in nature and supplies the output terminal 8 with the derived audio frequency information signal. Although not shown herein, it is recognized that the detected output signal obtained at the output terminal 8 is supplied through an audio frequency amplifier to a conventional sound transducer, such as a loud speaker system, to thus reproduce sound in response to the detected output signal.

The local oscillator 9 is a conventional variable frequency local oscillating circuit including a resonance circuit (not shown). The variable capacitance diode 10, connected to the local oscillator 9, is preferably connected in parallel with the resonance circuit of the oscillator. It is recognized that a variable capacitance diode admits of a capacitative reactance that is a function of a control signal applied thereto. As the magnitude of the control signal varies, the capacitative reactance exhibited by the variable capitance diode also varies. Consequently, since this diode is connected to the resonance circuit of the local oscillator 9, it is appreciated that the effective reactance of the oscillator varies in response to the alteration of the capacitative reactance of the diode 10. In an alternative embodiment, the variable capacitance diode 10 is replaced by other conventional variable reactance elements.

The variable capacitance diode 10 is coupled to the first manually operable switch SW1 via low-pass filter 11. Accordingly, a control signal that is supplied to the variable capacitance diode from the switch SW1 is subjected to a filtering operation by the low-pass filter which, preferably, is comprised of a series resistor 11a and a shunt capacitor 11b. The switch SW1 is comprised of a contact b connected to the low-pass filter 11 and includes further contacts a and c. In the illustrated embodiment, a movable contact armature d is adapted to selectively connect the contact b with either contact a or contact c. Accordingly, the movable armature d may comprise a slidable arm having a dimension that engages the contact b with only one of the contacts a or c in accordance with the position of the slidable arm. In an alternative embodiment, the contact b is connected to a movable contact, such as a pivotal switch arm adapted to engage the contact a in a first position and the contact c in a second position. Various other switching devices exhibiting this single poledouble throw feature can be used.

The contact c of the switch SW1 is connected to the FM detector 7 via a low-pass filter 12. This filter is similar to the aforenoted filter 11 and comprises a series resistor 12a and a shunt capacitor 12b. The contact a of the switch SW1 is connected to a terminal t. This terminal is adapted to supply signals to be transmitted by the FM receiver, such as audio signals, or the like. In one embodiment of this invention, the terminal t comprises an output terminal of a magnetic tape recording/playback device 14. As illustrated, signals recorded on the magnetic tape 16 are reproduced by a reproducing head 15 and amplified by an audio signal amplifier 17. These amplified signals are then supplied to the output terminal t from which they are adapted to be applied to the switch SW1. In an alternative embodiment, the audio signals supplied to the terminal t are derived from a microphone. Of course, various other signal generating devices may be used to supply the terminal t with suitable signals to be transmitted by the FM receiver 1.

The second manually operable switch SW2 is substantially similar to the aforedescribed switch SW1 and includes a contact b connected in common to the contact b of the switch SW1 and to the low-pass filter 11. The switch SW2 further includes another contact a adapted to be supplied with a reference potential, such as ground, and a further contact c. As illustrated, the further contact c is adapted to be electrically isolated and is here illustrated as not being electrically connected to further apparatus. A movable armature d is included in the switch SW2 to selectively connect the contact b with either the contact a or the contact c. As is recognized, the illustrated embodiment of the switch SW2 can be replaced by other embodiments of switches such as those described hereinabove with respect to the switch SW1.

The operation of the illustrated FM receiver will now be described. Let it first be assumed that an operator desires to utilize the signal transmission capability of the FM receiver. Accordingly, to establish the signal transmission mode, the movable armature d of the switch SW1 is operated so as to provide a signal transmission path between the fixed contacts a and b thereof. However, if the switch SW2 has been operated so as to be disposed in its ilustrated state wherein the fixed contacts a and b are interconnected, it is apparent that any signal supplied to the terminal b of the switch SW1 will be coupled to the contact b of the switch SW2, through the movable armature d to the fixed contact a thereof and thence to ground. Consequently, signals supplied to the fixed contact b of the switch SW1 will be prevented from being supplied through the low-pass filter 11 to the cathode of the variable capacitance diode 10. However, if the switch SW2 is operated such that the movable armature d electrically connects the fixed contacts b and c thereof, then a signal transmission path will be provided between the fixed contact b of the switch SW1 to the variable capacitance diode 10. Accordingly, audio signals that are supplied to the output terminal t, as by the signals reproduced from the magnetic tape 16 by the reproducing head 15, will be transmitted through the switch SW1 and through the low-pass filter 11 to the variable capacitance diode 10. As will be recognized, the capacitive reactance of the diode 10 will now vary in accordance with the audio signals that are supplied thereto. Consequently, as the capacitive reactance of the diode varies, the oscillating frequency of the local oscillator 9 likewise varies. Thus, a frequency modulated local oscillating signal is produced by the local oscillator. A leakage portion of this frequency modulated signal will now be radiated from the antenna 2 as a spurious wave. This transmitted FM signal can, of course, be received by another FM receiver in a conventional manner.

Now, if the movable armature d of the switch SW1 is operated so as to now connect the fixed contacts b and c, it is recognized that the illustrated FM receiver 1 will now operate in its conventional receiving mode. That is, signals that might be provided at the output terminal t are no longer transmitted to the variable capacitance diode 10 and the local oscillating frequency is no longer varied in accordance with such output signals. However, a portion of the detected signal provided at the output terminal 8 by the FM detector 7 will now be transmitted through the low-pass filter 12 to the fixed contact c of the switch SW1, and through the movable armature d to the fixed contact b. However, if the switch SW2 is operated so as to admit of the condition illustrated, then the movable armature d connects the fixed contacts a b thereof such that the signal appearing at the fixed contact b of the switch SW1 is now conducted to ground. That is, the portion of the detected output signal that is obtained from the FM detector 7 and that is to be used as a frequency controlling signal is here by-passed to ground. Accordingly, the wellknown automatic frequency control of the FM receiver 1 is prevented. Of course, if the switch SW2 is operated such that movable armature d connects the fixed contacts b c thereof, then the control signal derived from the FM detector 7 and supplied through the low-pass filter 12 and switch SW1 is now enabled to be transmitted through the further low-pass filter 11 to the variable capacitance diode 10. Consequently, the capacitance of the variable capacitance diode is varied in accordance with this supplied control signal and AFC operation of the FM receiver is performed. Hence, the local oscillating frequency of the signal produced by the local oscillator 9 is here varied in accordance with the detected output signal provided by the FM detector 7.

Thus it is seen that the switch SW2 as described hereinabove is used to selectively control AFC operation and local transmission. That is, this switch is used both as an AFC on/off switch and a transmission on/off switch. Consequently, the FM receiver 1 can here be controlled in its receiving mode to operate with AFC and to operate in a signal transmitting mode by a number of switching devices which is reduced from that heretofore required by the prior art receivers. Nevertheless, while reducing the number of switches that must be present, an operator retains full control over the switching of AFC, the switching of a receiving mode or a transmitting mode of the FM receiver and a switching on or off of a signal to be transmitted. Thus, by reducing the number of switches from three to two while retaining the capability of selectively controlling three switchable functions, the limited space requirements of an FM receiver can be advantageously utilized and the cost of producing such an FM receiver having a signal transmission capability is significantly reduced.

While the present invention has been particularly shown and described with reference to a certain preferred embodiment thereof, it will be obvious to those skilled in the art that various changes and modifications in form and details may be made without departing from the spirit and scope of the invention. It is therefore intended that the appended claims be interpreted as including all such changes and modifications.

What is claimed is:

1. In an FM receiver having an antenna; a local oscillator for supplying an oscillating signal to a mixer coupled to said antenna for producing an intermediate frequency FM signal, a leakage portion of said oscillating signal being radiated from said antenna as a spurious wave; an FM detector for demodulating said intermediate frequency FM signal to derive an audio signal therefrom; and frequency controlling means connected to said local oscillator for controlling the frequency of said oscillating signal in response to a control signal; apparatus for selectively operating said FM receiver in an AFC receiving mode or in a signal transmission mode, comprising: a first switch connected to said frequency controlling means and having a first state to couple an output signal of said FM detector to said frequency controlling means as said control signal therefor and a second state to couple a source of audio signals to said frequency controlling means as said control signal therefor to thereby produce a frequency modulated oscillating signal for transmission; a second switch operable independently of said first switch and having a first state to permit said control signals to be applied to said frequency controlling means and a second state to prevent said control signals from being applied to said frequency controlling means; and a low pass filter for transmitting said control signals to said frequency controlling means.

2. The FM receiver of claim 1 in which said source of audio signals comprises a signal reproducing head for reproducing an audio signal from magnetic tape.

3. The FM receiver of claim 1 wherein said frequency controlling means comprises a variable capacitance diode and said local oscillator includes a resonant circuit, said diode being connected to said resonant circuit for varying the resonance frequency thereof in response to said control signal.

4. An FM receiver having a signal transmission capability, comprising:

FM signal receiving means including an antenna, a mixer coupled to said antenna, a local oscillator coupled to said mixer and an FM detector coupled to the output of said mixer for receiving an FM signal and for detecting said received signal to derive an audio signal therefrom, a leakage portion of the signal produced by said local oscillator being radiated from said antenna as a spurious wave;

frequency controlling means including a variable capacitance diode connected to said local oscillator and responsive to a control signal applied thereto for controlling the frequency of said signal produced by said local oscillator;

a source of audio signals to be transmitted by said FM receiver;

a first switch connected to said frequency controlling means for selectively establishing a signal path between said frequency controlling means and either said FM detector or said source of audio signals to supply, as said control signal, either a portion of the signal produced by said FM detector or said audio signals to be transmitted, respectively;

at least one low-pass filter connected in said selectively established signal path; and a second switch connected to said selectively established signal path and selectively operable to prevent said control signal from being supplied to said frequency controlling means.

* * * * *